United States Patent
Ramlall

(10) Patent No.: US 10,778,451 B2
(45) Date of Patent: Sep. 15, 2020

(54) DEVICE AND METHOD FOR HARDWARE TIMESTAMPING WITH INHERENT SECURITY

(71) Applicant: The United States of America as represented by the Secretary of the Navy, San Diego, CA (US)

(72) Inventor: Rohan Y. Ramlall, Brentwood, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 311 days.

(21) Appl. No.: 16/048,841

(22) Filed: Jul. 30, 2018

(65) Prior Publication Data

US 2020/0036538 A1    Jan. 30, 2020

(51) Int. Cl.
| | |
|---|---|
| H04L 9/00 | (2006.01) |
| H04L 9/32 | (2006.01) |
| H03K 3/037 | (2006.01) |
| H04L 9/08 | (2006.01) |
| H03K 3/03 | (2006.01) |

(52) U.S. Cl.
CPC .......... *H04L 9/3278* (2013.01); *H03K 3/037* (2013.01); *H03K 3/0315* (2013.01); *H04L 9/0861* (2013.01); *H04L 9/0894* (2013.01); *H04L 9/3297* (2013.01)

(58) Field of Classification Search
CPC ... H04L 9/3278; H04L 9/0861; H04L 9/0894; H04L 9/3297; H03K 3/0315; H03K 3/037
See application file for complete search history.

(56) References Cited

U.S. PATENT DOCUMENTS

| | | | |
|---|---|---|---|
| 3,267,473 A * | 8/1966 | Galloway | G01S 1/02 |
| | | | 342/398 |
| 8,610,454 B2 | 12/2013 | Plusquellic | |
| 9,030,226 B2 | 5/2015 | Plusquellic | |
| 9,571,276 B2 | 2/2017 | Falk | |
| 9,628,272 B2 | 4/2017 | Rostami | |
| 9,787,670 B2 | 10/2017 | Kim | |
| 9,946,858 B2 | 4/2018 | Wallrabenstein | |
| 10,452,358 B2 * | 10/2019 | Aoyagi | H03K 19/21 |

(Continued)

OTHER PUBLICATIONS

Herder, Meng-Day, Koushanfar, Devadas, Physical Unclonable Functions and Applications: A Tutorial, in Proceedings of the IEEE, vol. 102, No. 8, pp. 1126-1141, Aug. 2014.

(Continued)

*Primary Examiner* — John B King
*Assistant Examiner* — Darshan I Dhruv
(74) *Attorney, Agent, or Firm* — Naval Information Warfare Center, Pacific; Kyle Eppele

(57) ABSTRACT

Disclosed are physical unclonable functions ("PUFs") that provide both a hardware timestamp and an encryption key. The timestamp is more accurate than traditional timestamps generated by software calls to the computing device's operating system, while the encryption key can be used for, among other things, securing time-synchronization packets sent across a network. By combining timestamp generation with encryption key generation, the PUFs provide enhanced security while being cheaper to build and to operate than the specialized cryptographic hardware that they replace.

17 Claims, 7 Drawing Sheets

(56) References Cited

U.S. PATENT DOCUMENTS

| | | | | |
|---|---|---|---|---|
| 10,469,059 B1* | 11/2019 | Hars | | G06F 1/08 |
| 10,469,060 B1* | 11/2019 | Hars | | H03K 3/0315 |
| 2003/0204743 A1* | 10/2003 | Devadas | | G06Q 20/3674 |
| | | | | 726/9 |
| 2005/0128013 A1* | 6/2005 | Koike | | G06F 1/04 |
| | | | | 331/74 |
| 2005/0140418 A1* | 6/2005 | Muniandy | | G06F 1/04 |
| | | | | 327/291 |
| 2010/0031065 A1* | 2/2010 | Futa | | H04L 9/0866 |
| | | | | 713/194 |
| 2010/0100759 A1* | 4/2010 | Blixt | | G06F 1/14 |
| | | | | 713/502 |
| 2011/0066670 A1* | 3/2011 | Yu | | G06F 7/582 |
| | | | | 708/252 |
| 2014/0225639 A1* | 8/2014 | Guo | | H04L 9/0866 |
| | | | | 326/8 |
| 2015/0072447 A1* | 3/2015 | Shen-Orr | | H01L 23/576 |
| | | | | 438/17 |
| 2015/0101037 A1* | 4/2015 | Yang | | H04L 9/3278 |
| | | | | 726/16 |
| 2017/0310688 A1* | 10/2017 | Lecomte | | H04L 9/3278 |
| 2019/0019766 A1* | 1/2019 | Hori | | H01L 21/82 |
| 2019/0384908 A1* | 12/2019 | Hars | | G06F 21/554 |
| 2019/0384915 A1* | 12/2019 | Hars | | H04L 9/3236 |
| 2019/0386664 A1* | 12/2019 | Hars | | H03K 3/0315 |

OTHER PUBLICATIONS

Fundamentals of the Electronic Counters, Application Note 200, Electronic Counter Series, Hewlett-Packard Company.

Forcan, Concept Creation and Design of a Parameterizable, fast-locking 65nm CMOS CDR-PLL for Gigabit Serial Chip-to-Chip Communication in Mobile Devices, University of Duisburg-Essen, Department of Microwave and RF-Technology & Nokia Research Center Bochum.

Yu, Leong, Xu, An FPGA Chip Identification Generator Using Configurable Ring Oscillators, in IEEE Trans. on VLSI Systems, vol. 20, No. 12, pp. 2198-2207, Dec. 2012.

* cited by examiner

| Time Interval | Standard Deviation of DVI Measurement |
|---|---|
| ~50ns | ~100ps |
| ~1μs | ~200ps |
| ~100μs | ~3ns |

FIG. 4

| Frequency Order of PUF Oscillators (Smallest to Highest) | Resulting Bits for the Encryption Key |
| --- | --- |
| A, B, C | 000 |
| A, C, B | 001 |
| B, A, C | 010 |
| B, C, A | 011 |
| C, A, B | 100 |
| C, B, A | 101 |

FIG. 8

DEVICE AND METHOD FOR HARDWARE TIMESTAMPING WITH INHERENT SECURITY

FEDERALLY SPONSORED RESEARCH OR DEVELOPMENT

The United States Government has ownership rights in this invention. Licensing inquiries may be directed to the Office of Research and Technical Applications, Space and Naval Warfare Systems Center, Pacific, Code 72120, San Diego, Calif., 92152; telephone (619)553-5118; email: ssc_pac_t2@navy.mil, referencing NC 103841.

TECHNICAL FIELD

The present disclosure is related generally to microcircuits and, more particularly, to physical unclonable functions.

BACKGROUND

There exist computer-networking protocols that allow computing devices to synchronize their internal clocks with remote, official timekeepers. In some applications, such as international financial transactions, the requirements for synchronization are becoming increasing strict, calling for, in the near future, near-nanosecond agreement with a master clock.

However, achieving the requisite clock agreement is less than useful if the timing information sent over the network is not secure against malicious interference. For clock-synchronization, as well as for many other applications, computing devices use encryption techniques both to secure their transmissions and to authenticate their identities to their interlocutors.

In order to support the necessary dual functions of securing information and authenticating itself to other devices, a typical computing device uses two items: First, one or more secret cryptographic keys and, second, dedicated cryptographic hardware. That hardware reads the keys and may use them (i) to encode the information that the computing device wishes to send, (ii) to decode encrypted information that the computing device has received, (iii) to authenticate the device to remote devices, and (iv) to check the authentication of those remote devices in turn.

However, both of these two items have decided drawbacks in their current implementations. The cryptographic hardware is expensive, and it consumes a significant amount of power and space within the computing device. This hardware may also be vulnerable to malicious attacks if the computing device falls into the wrong hands.

The device's cryptographic keys are kept secret and are stored in the device's non-volatile memory. But just like a physical key to a physical lock, if a malicious party can find the key, then the key can be copied or destroyed which would impair the security of the computing device.

BRIEF SUMMARY

The techniques of the present disclosure address drawbacks of the prior art through a unique application of physical unclonable functions ("PUFs"). The present disclosure uses PUFs to provide both a hardware timestamp and an encryption key. In accordance with one aspect of the present disclosure, an integrated circuit device is provided. The circuit device comprises a start oscillator group configured to start upon receiving a start signal; a first coincidence detector configured to detect a coincidence of an output of the start oscillator group and a reference oscillator signal; and a stop oscillator group configured to start upon receiving a stop signal. The integrated circuit device also comprises a second coincidence detector configured to detect a coincidence between an output of the stop oscillator group and the reference oscillator signal; a first counter configured to start upon receiving the start signal, to increment a first accumulator when receiving an output of the start oscillator group, and to stop when receiving an output of the first coincidence detector.

The integrated circuit device further comprises a second counter configured to start when receiving an output of the first coincidence detector, to increment a second accumulator when receiving the reference oscillator signal, and to stop when receiving an output of the second coincidence detector; a third counter configured to start when receiving an output of the second coincidence detector, to increment a third accumulator when receiving the reference oscillator signal, and to stop when receiving an output of the first coincidence detector; and a fourth counter configured to start upon receiving the stop signal, to increment a fourth accumulator when receiving an output of the second oscillator group, and to stop when receiving an output of the second coincidence detector. Each of the start and stop oscillator groups comprises a plurality of oscillators implemented as PUFs.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 4 is a table of experimental results showing the stability of measuring time intervals using the DVI calculation of FIG. 1;

FIG. 8 is a table showing how bits of an exemplary 3-bit encryption key can be assigned.

DETAILED DESCRIPTION

Figure 1:
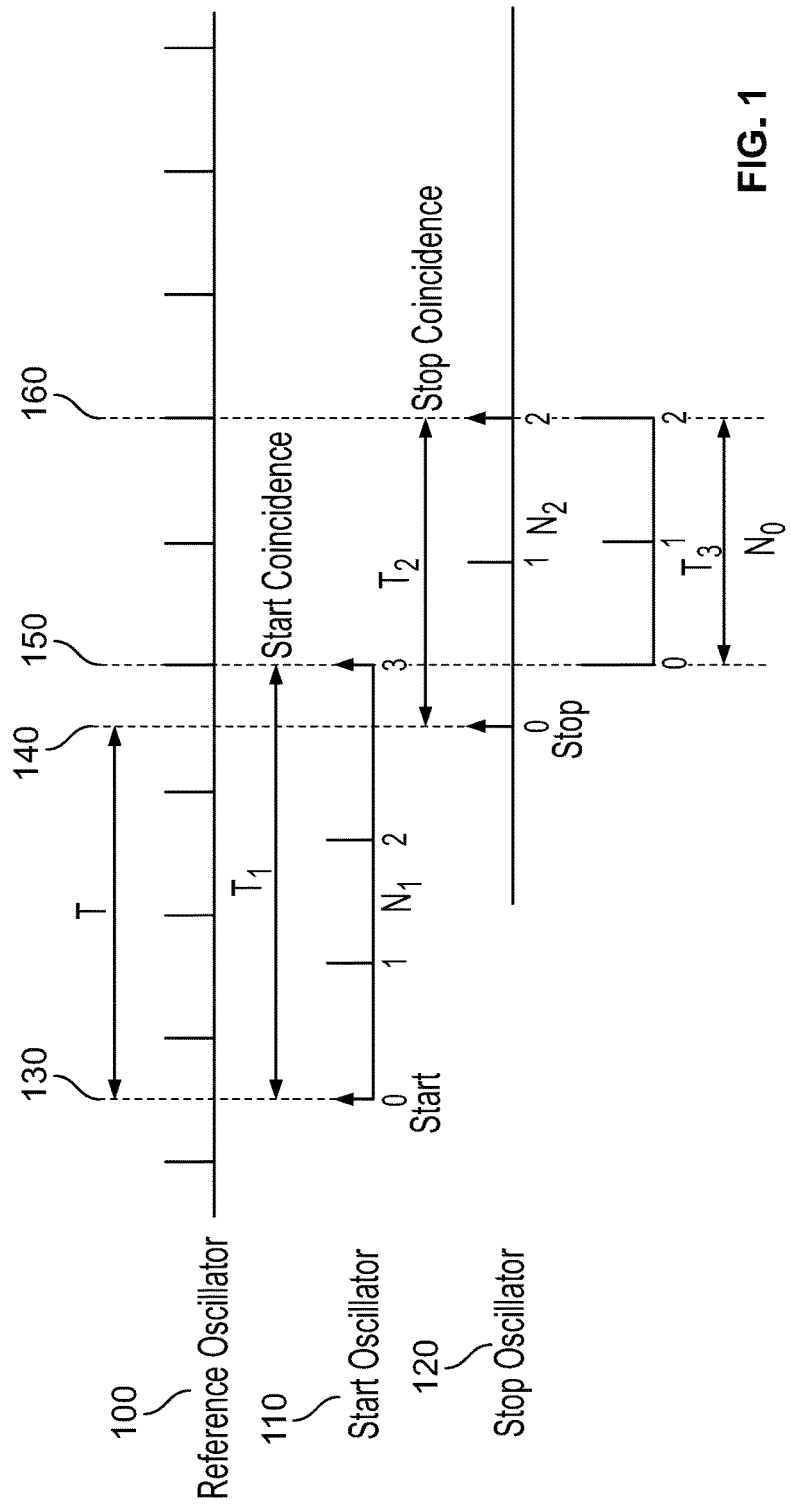
FIG. 1 is a timing diagram showing how dual vernier interpolation ("DVI") is used to accurately measure a time interval.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The widespread use of microcircuits, and indeed of the computing devices that use them, is based at least in part on the efforts of their manufacturers to ensure that the microcircuits are made to operate as identically to one another as is currently physically possible. Generally speaking, any minute operational differences from one copy of a microcircuit to another are hidden by layers of hardware and software processing within the device so that in the end, those minute differences do not in any way affect the operations of the device.

PUFs, on the other hand, are hardware circuits specifically designed to make use of those subtle, but ever present, differences between one microcircuit and the next. Every physical device is constructed from atoms, and even the smallest gate in a microcircuit made today contains many atoms (although "many" is a figure that shrinks with each new generation of computing hardware). In aggregate, one many-atom gate acts much like any other, but because not every atom in one gate is laid down in exactly the same relation to its neighboring atoms in one microcircuit as in the next, very subtle differences in operation arise from their fundamentally, but very slightly, different physical structures. Thus, if two computing devices are designed to contain identically specified PUFs, and if those two devices were manufactured exactly alike using the very best materials and methods currently in use, then the two resulting PUFs would not produce exactly the same output.

This is the basic property of PUFs: Even if someone knew exactly the operating characteristics of a PUF on one device and could measure its output using very expensive and accurate test gear, that someone would not know exactly the characteristics of a PUF on any other computing device. Which means that from one device to another, PUFs are "unclonable" and can thus serve as indicators of unique identity.

The techniques discussed herein leverage this property of PUFs to create both hardware timestamps and encryption keys in a manner cheaper than existing dedicated cryptographic hardware and in a more secure manner because the resulting key need not be stored permanently but can be newly derived whenever needed by accessing the PUFs.

This presentation first discusses how the PUFs create a very accurate timestamp. Then, a method for producing cryptographic keys by means of the PUFs is explained.

FIG. 1 presents a scenario where the well known dual-vernier interpolation ("DVI") technique is used to accurately measure a time interval starting at time 130 and ending at time 140. T represents the duration of this interval to be measured.

When the interval T begins at time 130, a start oscillator 110 is triggered to start running. At the end 140 of the to-be-measured interval T, a stop oscillator 120 is triggered. When $T_0$ is the period of the reference oscillator 100, the period of each of the start oscillator 110 and the stop oscillator 120 is $T_0$ (1+1/N) where N is the oscillator's interpolation factor.

As the start oscillator 110 and the stop oscillator 120 run, the "ticks" of the start oscillator 110 and of the stop oscillator 120 are sent as inputs to counting registers. In the example of FIG. 1, the start oscillator 110 ticks $N_1$ times in the time interval $T_1$ before stopping, and the stop oscillator 120 ticks $N_2$ times in the interval $T_2$.

The counting for each of the start oscillator 110 and of the stop oscillator 120 stops when the tick coincides with the tick of the reference oscillator 100. More technically, the ticks of a start oscillator 110 or of a stop oscillator 120 coincide with that of the reference oscillator 100 when their rising edges occur simultaneously.

Meanwhile, the ticks of the reference oscillator 100 are counted for the interval $T_3$ between when the start oscillator 110 stops at time 150 and when the stop oscillator 120 stops at time 160. Call this count $N_0$. Note that $N_0$ can be either positive (if time 160 occurs after time 150 as in the example of FIG. 1) or negative (if those times 150, 160 occur in the reverse order).

Keeping the above definitions in mind and referring back to FIG. 1, it is clear that:

$$T_1+T_3=T+T_2$$

Rearranging:

$$T=T_1-T_2+T_3$$

Also note from the above definitions that:

$$T_1=N_1*T_0*(1+1/N);$$

$$T_2=N_2*T_0*(1+1/N); \text{ and}$$

$$T_3=N_0*T_0 \text{(where } N_0<0 \text{ when time 160 precedes time 150)}$$

Thus, the duration of the interval T has been measured in terms of counted ticks, of the period of the reference oscillator 100, and of the triggered oscillators' interpolation factor N.

DVI's resolution in measuring time values is based on the period ($T_0$) of the reference oscillator 100 and on the aforementioned interpolation factor (N) of the start oscillator 110 and of the stop oscillator 120. The larger the value of N, the higher the resolution achieved by DVI because a greater N makes the periods of the start oscillator 110 and of the stop oscillator 120 ($T_0*(1+1/N)$) closer to the period of the reference oscillator 100. That in turn increases the resolution based on the counts $N_1$ and $N_2$, yielding a resolution for DVI of $T_0/N$. For example, with a reference oscillator 100 running at 100 MHz and N equal to 8, DVI's resolution is 10 nanoseconds/8 which is 1.25 nanoseconds. With N increased to 256, DVI's resolution improves to 10 nanoseconds/256 which is 39 picoseconds.

Figure 2:
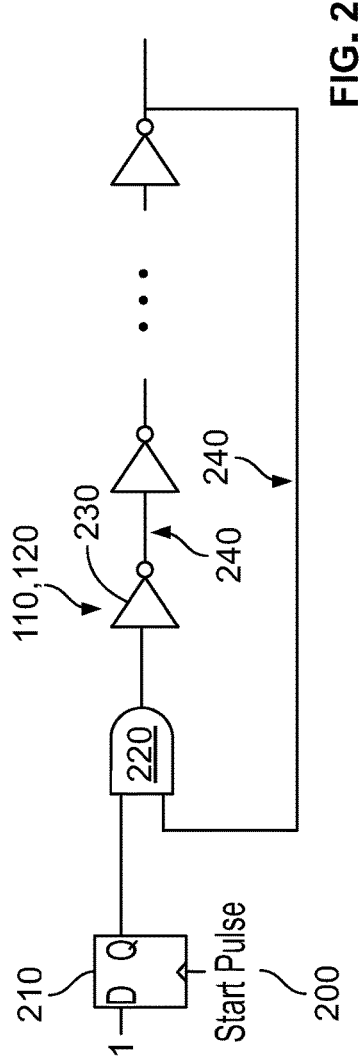
FIG. 2 is a circuit diagram of a representative triggered oscillator that can be used for the DVI calculation of FIG. 1.

From the above discussion, it is clear that the start oscillator 110 and the stop oscillator 120 are very important components of any DVI circuit. FIG. 2 presents one implementation possibility for the start oscillator 110 and for the stop oscillator 120: the ring oscillator. In this circuit, the rising edge of the start pulse 200 (generated at time 130 in FIG. 1) causes the output of the flip flop 210 to go high which starts the start ring oscillator 110. In a similar manner, a stop signal at time 140 causes the flip flop 210 of the stop oscillator 120 to go high which causes the stop oscillator 120 to begin oscillating.

The period of each of the start oscillator 110 and of the stop oscillator 120 is determined by the sum of the delays of the and gate 220, the inverters 230, and the interconnecting wires 240. In some embodiments, the inverters 230 are implemented using Look-Up-Tables ("LUTs"), one LUT serving each inverter 230. LUTs at different locations yield different delays, so the locations of the LUTs are chosen to give each of the start oscillator 110 and of the stop oscillator 120 the desired oscillation period.

Figure 3A:
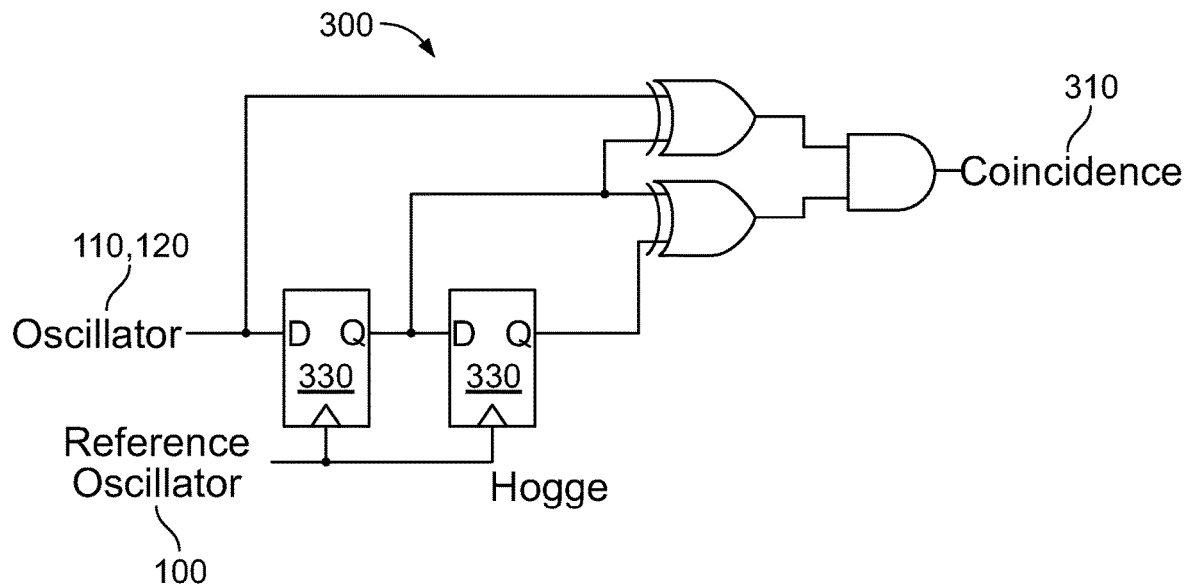
FIGS. 3A and 3B are circuit diagrams of two phase detectors (Hogge and Alexander, respectively) that may be used as coincidence detectors for the DVI calculation of FIG. 1.
Figure 3B:
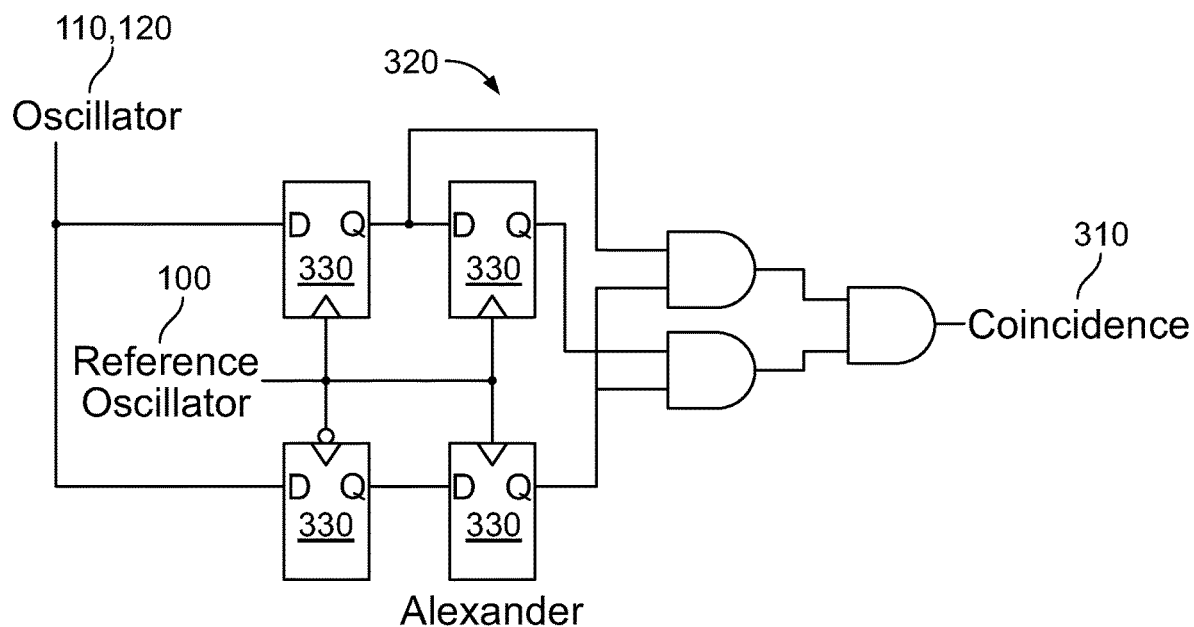

Coincidence detectors are also important components of the DVI circuit. They stop the start oscillator 110 at time 150 and stop the stop oscillator 120 at time 160. These coincidence detectors can be implemented as phase detectors because coincidence is detected by comparing the phase of signals produced by the oscillations of the start oscillator 110 and of the stop 120 oscillator with the phase of the reference oscillator 100. Two well known phase detectors are shown in FIGS. 3A and 3B. Each phase detector 300 and phase detector 320 takes as input the reference signal 100 and the oscillations of one of the start oscillator 110 and of the stop 120 oscillator. When the coincidence is detected, that is signaled in the output 310.

Both the Hogge phase detector 300 of FIG. 3A and the Alexander phase detector 320 of FIG. 3B have a constant phase error caused by the CLocK input to Q output delay in their flip flops 330. The Hogge phase detector 300 handles a wider frequency range of signals and has less output jitter than the Alexander phase detector 320, although either can be used in the DVI circuit.

Recall from the above discussion of FIG. 1 that the resolution of the DVI is $T_0/N$. However, the table of FIG. 4 shows that the standard deviation of the DVI measurement of a time interval T increases with the length of that time interval. Because the jitter of the reference oscillator 100 increases with longer time intervals, the DVI method of FIG. 1 works best over shorter periods of time.

(The measurements in FIG. 4 were obtained from a DVI implemented on a Virtex™ 4 XC4VFX20 field-programmable gate array with a speed grade of −11 and a reference oscillator 100 with a frequency stability of 25 parts per million.)

Figure 5:
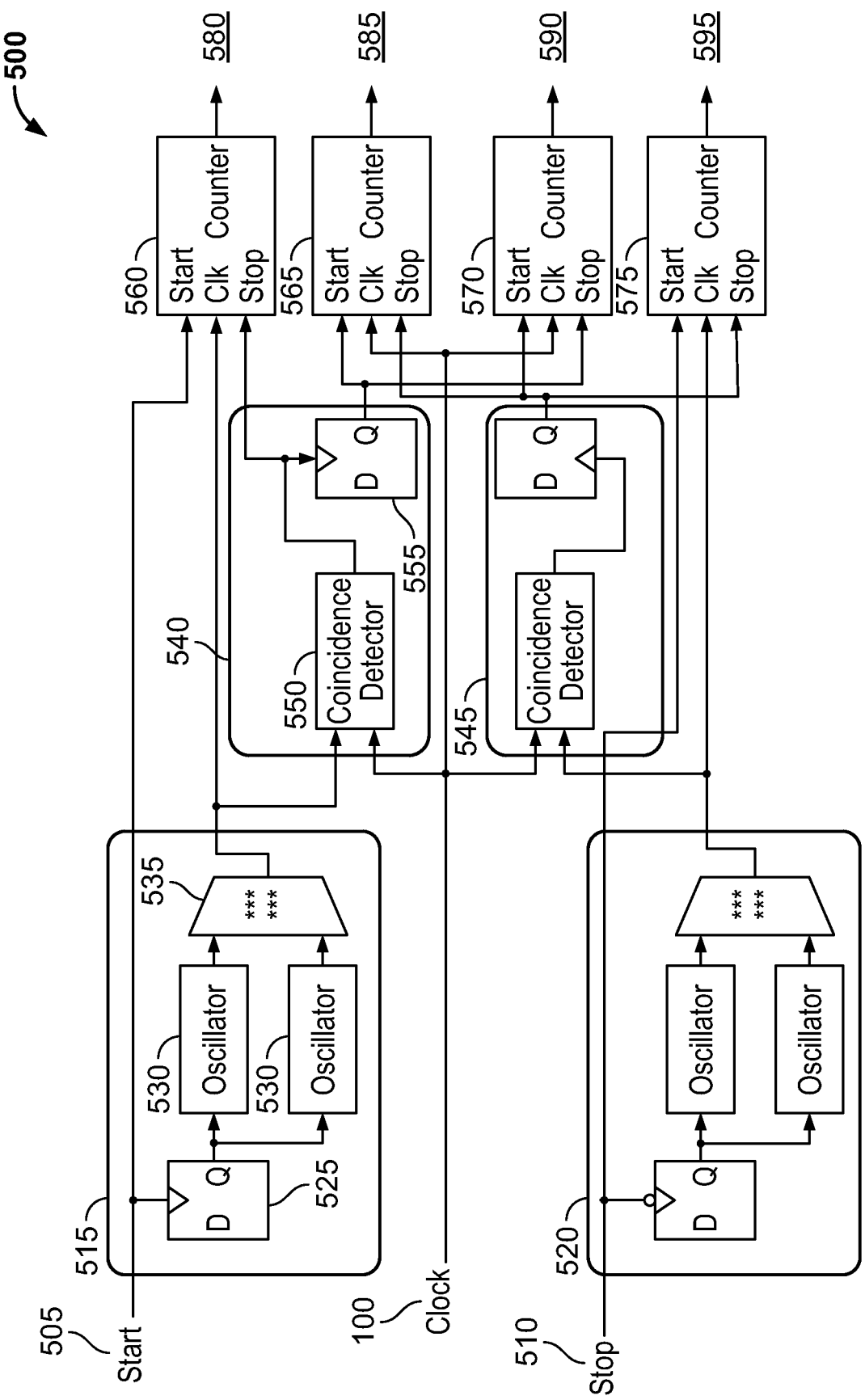
FIG. 5 is a diagram of a circuit that uses PUFs to generate both a timestamp and an encryption key.

FIG. 5 presents one embodiment of a circuit 500 that uses PUFs both to implement DVI for very accurate interval timing and to produce one or more encryption keys. First, we'll review the components of this circuit 500, and then we'll consider its operation with respect to its two functions. Many of the components of the circuit 500 will be familiar from the discussion above of FIG. 1.

Note that the circuit 500 may be implemented on a separate micro-chip, such as a field-programmable gate array. In other embodiments, the circuit 500 is incorporated into a much more complicated integrated circuit device such as a microprocessor chip or a graphics processing unit.

The logic of the circuit 500 flows generally from left to right. Beginning at the leftmost edge are the start signal 505, the reference oscillator 100 which in this embodiment is seen to be the system clock, and the stop signal 510.

Following next are the most significant departures from a simple application of the DVI method of FIG. 1 to a hardware implementation: Rather than a single start oscillator 110 and a single stop oscillator 120 as implied by FIG. 1, the circuit 500 has a "start oscillator group" 515 and a "stop oscillator group" 520. Each of the start oscillator group 515 and the stop oscillator group 520 begins with a D flip flop 525 triggered, for the start oscillator group 515, by receiving the start signal 505 and, for the stop oscillator group 520, by receiving the stop signal 510. In both the start oscillator group 515 and the stop oscillator group 520, the output of the D flip flop 525 leads to a set of PUF oscillators 530 wired in parallel. The PUF oscillators 530 start oscillating when they receive a signal from the D flip flop 525.

(For clarity's sake, the circuit 500 only shows two parallel PUF oscillators 530 in each of the start oscillator group 515 and the stop oscillator group 520. As is discussed below, the start oscillator group 515 and the stop oscillator group 520 may each contain many more PUF oscillators 530 than two, the specific number being decided by application considerations.)

The type of PUF chosen for the PUF oscillators 530 is application dependent. For example, each PUF may be a delay PUF (such as the ring oscillator illustrated in FIG. 2 and possibly using LUTs), a static random-access memory PUF, a butterfly PUF, a bistable ring PUF, a digital PUF, or a metal resistance PUF. Although it is not strictly required, for practical reasons, all of the PUF oscillators 530 in a given implementation are probably of the same type.

Within each of the start oscillator group 515 and the stop oscillator group 520, the outputs of all of the parallel PUF oscillators 530 feed into a multiplexor 535 which selects one of its inputs and then outputs it in turn, ignoring all of its other inputs.

Via their multiplexors 535, the outputs of the start oscillator group 515 and of the stop oscillator group 520 feed into the start coincidence detector 540 and the stop coincidence detector 545, respectively. Each of the start coincidence detector 540 and the stop coincidence detector 545 includes the actual coincidence detector circuit 550 and a flip flop 555. The coincidence detectors 550 may be Hogge 300 or Alexander 320 phase detectors as discussed above in reference to FIGS. 3A and 3B. Other types of coincidence detectors 550 are also feasible for some embodiments.

To do the actual counting of clock and oscillator ticks as discussed above in reference to FIG. 1, a first counter 560, a second counter 565, a third counter 570, and a fourth counter 575 accept inputs from various combinations of the start signal 505, the stop 510 signal, the clock signal 100, the start oscillator group 515, the stop oscillator group 520, the start coincidence detector 540, and the stop coincidence detector 545. Each of the first counter 560, the second counter 565, the third counter 570, and the fourth counter 575 includes an accumulator that holds the number of ticks counted so far.

Finally, all the way to the right of FIG. 5 are the first output 580, the second output 585, the third output 590, and the fourth output 595 of their respective first counter 560, second counter 565, third counter 570, and fourth counter 575.

Figure 6:
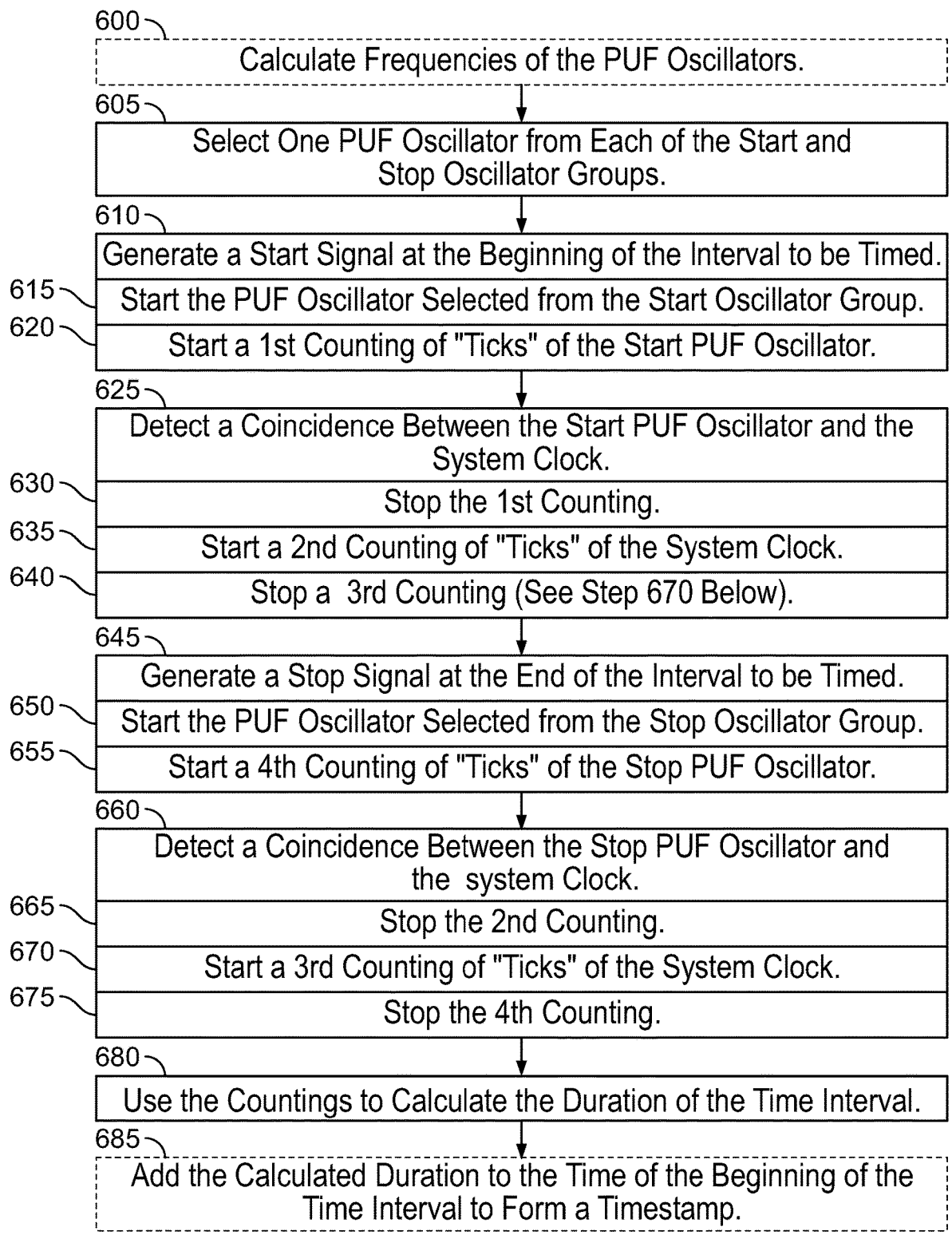
FIG. 6 is a flowchart of a representative method for using a circuit such as the one of FIG. 5 for timing an interval.

FIG. 6 presents an exemplary method for using the circuit 500 of FIG. 5 to perform the DVI operation of FIG. 1. Step 600 is not actually part of the DVI method, but it is a necessary preliminary. As discussed above in relation to FIG. 1, important inputs into the DVI calculation are the frequencies of the start oscillator 110 and of the stop oscillator 120. In this step 600, the oscillation frequencies of the PUF oscillators 530 in the start oscillator group 515 and in the stop oscillator group 520 are determined. This step is discussed at length below in reference to FIG. 7.

From the discussion of the DVI method of FIG. 1, it is clear that only the start oscillator 110 and stop oscillator 120 are required. However, the circuit embodiment of FIG. 5 includes more than two PUF oscillators 530 for reasons that are explained below in reference to FIG. 7.

Thus, in step 605, one PUF oscillator 530 is selected from the start oscillator group 515, and one PUF oscillator 530 is selected from the stop oscillator group 520. A specific PUF oscillator 530 is selected by telling the multiplexor 535 to select the output of that PUF oscillator 530 as its own output. (The outputs of the non-selected PUF oscillators 530 in the start oscillator group 515 and in the stop 520 oscillator group are ignored and play no role in the DVI method.)

The DVI method actually begins in step 610. At the beginning of the interval T to be measured (this is at time 130 of FIG. 1), circuit logic generates a start signal 505. This signal 505 causes the flip flop 525 of the start oscillator group 515 to go high which in turn triggers the selected start PUF oscillator 530 to begin oscillating (step 615). (In some embodiments, all of the PUF oscillators 530 in the start oscillator group 515 start oscillating at this point, but, as discussed just above, the oscillations of the non-selected PUF oscillators 530 are ignored.) The start coincidence detector 540 begins to compare the rising edges of the oscillations of the selected start PUF oscillator 530 and the system clock 100.

As seen in FIG. 5, this same start signal 505 is received by the first counter 560 which then starts. This first counter 560 receives the output of the multiplexor 535 of the start oscillator group 515 and thus begins to increment an accumulator which counts the ticks of the selected start PUF oscillator 530. (This first counter 560 is counting the ticks for the time interval $T_1$ of FIG. 1.)

In FIG. 6, steps 610, 615, and 620 are pushed together to indicate that steps 615 and 620 result from step 610.

Eventually, the rising edge of the selected start PUF oscillator 530 coincides with the rising edge of the system clock 100. This occurs at time 150 of FIG. 1 and is detected in step 625 by the start coincidence detector 540 which outputs a signal which is received by the first counter 560 which subsequently stops counting any more ticks (step 630). The signal is also received by the second counter 565 which begins incrementing an accumulator to count ticks of the system clock 100. (This second counter 565 is counting the ticks of the time interval $T_3$ of FIG. 1.)

As discussed above in reference to FIG. 1, there is no guarantee that time 160 (the detection of the stop coincidence; see the discussion of step 660 below) follows time 150 (the detection of the start coincidence; step 625). Therefore, two counters are used to potentially count the ticks of the system clock 100 during the interval $T_3$ between the time 150 and the time 160. The output of the second counter 565 is used when time 150 precedes time 160 as in the example of FIG. 1. The output of the third counter 570 is used when time 160 precedes time 150. In order to make sure that both cases are covered, the third counter 570 stops (step 640) when it receives a signal output by the start coincidence detector 540 (step 625), even though that third counter 570 may not have even begun counting yet.

At the end of the to-be-timed interval T, circuit logic generates a stop signal 510 (step 645). (This is at time 140 of FIG. 1). The stop signal 510 is received by the fourth counter 575 which then starts. The stop signal 510 also triggers the selected PUF oscillator 530 of the stop oscillator group 520 to start oscillating (step 650), which oscillations pass through the multiplexor 535 of the stop oscillator group 520 to the stop coincidence detector 545 and are received by the fourth counter 575 which increments its accumulator to count those oscillations (step 655).

When the stop coincidence detector 545 detects a coincidence of the rising edges of the oscillations of the selected stop PUF oscillator 530 and the system clock 100 (step 660) (this is time 160 of FIG. 1), it outputs a signal which is received by the second counter 565 which subsequently stops counting (step 665). The second counter 565 has now counted the oscillations of the system clock 100 during the time period $T_3$ (to be used in step 680 for those cases where time 160 occurs after time 150 as shown in the example of FIG. 1).

At the same time, the signal output by the stop coincidence detector 545 is received by the third counter 570 which is then initialized and starts incrementing its accumulator to count ticks of the system clock 100 over the time period $T_3$ (step 670). (The output of this third counter 570 is used in step 680 when time 150 follows time 160 unlike the scenario depicted in FIG. 1.)

The output signal from the stop coincidence detector 545 is received by the fourth counter 575 (counting oscillations of the selected stop PUF oscillator 530 for the time period $T_2$) which then stops in step 675.

In step 680, circuit logic uses the results of the various countings to calculate the duration of the time interval T. To summarize, here are the outputs of the four counters, in the notation used above in reference to FIG. 1:

Counter 560: $N_1$
Counter 565: $N_0$ (when time 160 follows time 150 as in FIG. 1)
Counter 570: $N_0$ (when time 160 precedes time 150)
Counter 575: $N_2$ The calculation for determining the duration of the to-be-timed interval T is given above with reference to FIG. 1. Note that in the scenario depicted in FIG. 1, the $N_0$ generated by counter 570 is ignored. In the other cases, the $N_0$ produced by counter 565 is ignored, and the $N_0$ produced by counter 570 is multiplied by −1 before performing the calculations.

Now that the circuit 500 has applied the DVI method to measure the time interval T between the start signal 505 (time 130) and the stop signal 510 (time 140), that calculated duration can be added to the known time at the beginning of the interval T (time 130) to generate a very accurate time-stamp for the time at the end of the interval T (time 140). That timestamp can be used for, among other things, time-stamping a packet when it is ready to be sent across the network in a time-synchronization protocol. The method of FIG. 6 as implemented by the circuit 500 is preferable to other methods because of its accuracy and because it avoids the inevitable time delays of timestamping based on software calls to the operating system.

To recap some of the elements of the circuit 500 of FIG. 5:

The start oscillator group 515 includes a D flip flop 525 which triggers when it receives the start signal 505, a number of PUF oscillators 530 wired in parallel that start oscillating when they receive a signal from the D flip flop 525, and a multiplexor 535 which receives the outputs of the PUF oscillators 530 and sends a selected one of its inputs as its output.

The stop oscillator group 520 includes a D flip flop 525 which triggers when it receives the stop signal 510, a number of PUF oscillators 530 wired in parallel that start oscillating when they receive a signal from the D flip flop 525, and a multiplexor 535 which receives the outputs of the PUF oscillators 530 and sends a selected one of its inputs as its output.

The start coincidence detector 540 includes a coincidence detector circuit 550 and a flip flop 555. When it detects a coincidence between the output of the start oscillator group 515 and the reference oscillator signal 100, it sends a signal to the first counter 560, to the second counter 565, and to the third counter 570.

The stop coincidence detector 545 includes a coincidence detector circuit 550 and a flip flop 555. When it detects a coincidence between the output of the stop oscillator group 520 and the reference oscillator signal 100, it sends a signal to the second counter 565, to the third counter 570, and to the fourth counter 575.

The first counter 560 starts upon receiving the start signal 505, increments its accumulator to count oscillations received from the start oscillator group 515, and stops when it receives a signal from the start coincidence detector 540.

The second counter 565 starts when it receives a signal from the start coincidence detector 540, increments its accumulator to count oscillations of the reference oscillator signal 100, and stops when it receives a signal from the stop coincidence detector 545.

The third counter 570 starts when it receives a signal from the stop coincidence detector 545, increments its accumulator to count oscillations of the reference oscillator signal 100, and stops when it receives a signal from the start coincidence detector 540.

The fourth counter 575 starts when it receives the stop signal 510, increments its accumulator to count oscillations of the stop oscillator group 520, and stops when it receives a signal from the stop coincidence detector 545.

Figure 7:
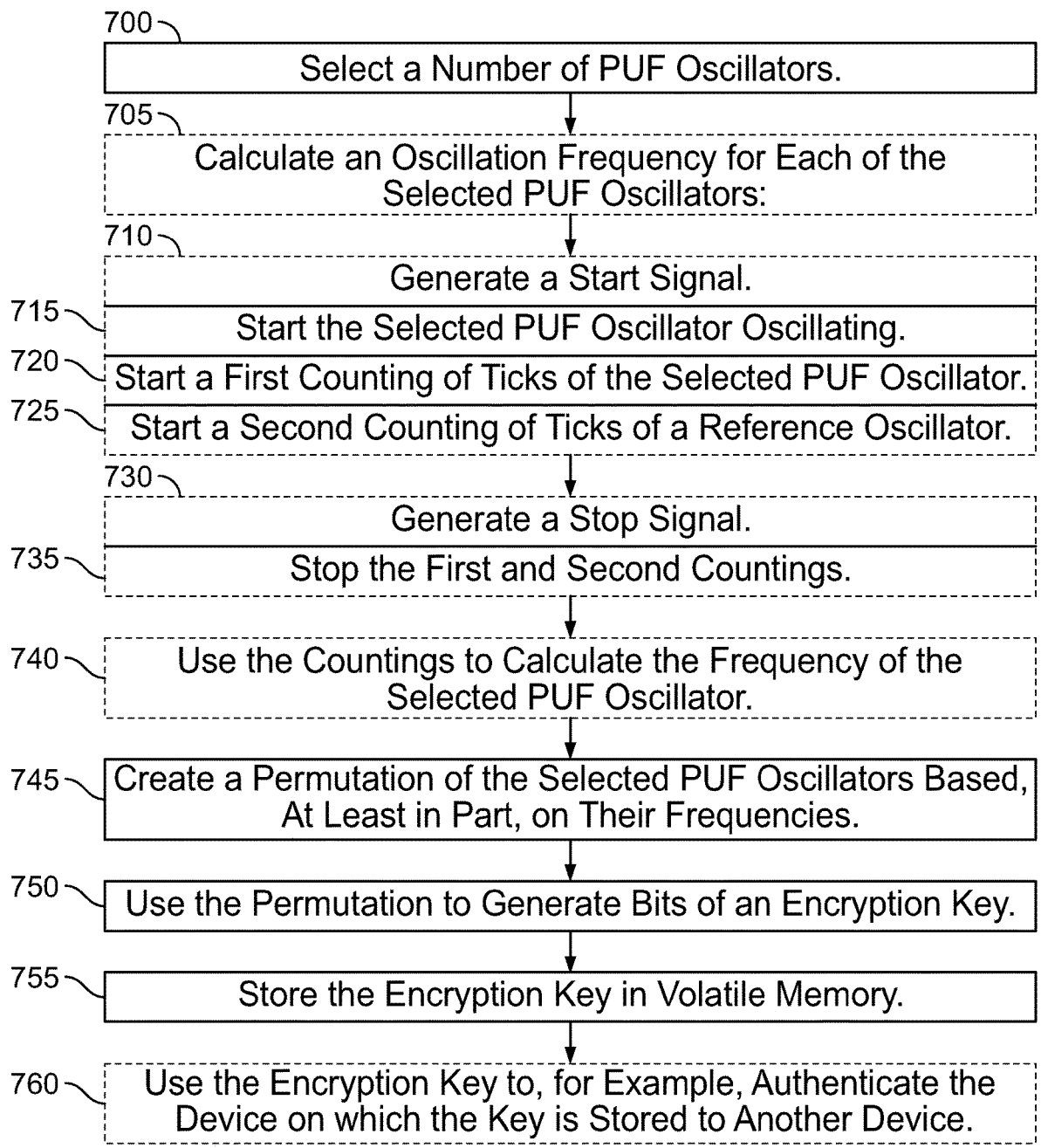
FIG. 7 is a flowchart of a representative method for using a circuit such as the one of FIG. 5 for creating an encryption key.

Next turn to the flowchart of FIG. 7 where the circuit 500 of FIG. 5 performs a very different, but conceptually related, task: It uses the PUF oscillators 530 to generate one or more encryption keys.

The method begins at step 700 where a number of PUF oscillators 530 are chosen for use throughout the remainder of the method. As discussed above, the DVI method only needs two PUF oscillators 530, however, generating an encryption key uses many more. Specifically, the circuit 500 uses R PUF oscillators 530 to generate:

ceiling(log base 2(R!))

bits of an encryption key. The reason for this formulation is apparent from the following description, but for now note that the length of encryption keys is generally a power of 2, with more bits making the encryption stronger, and with a length of 128 bits being pretty much a minimum allowable today.

The selected R PUF oscillators 530 can be distributed in any way throughout the start oscillator group 515 and the stop oscillator group 520, but it just makes sense to include R/2 from each of the start oscillator group 515 and the stop oscillator group 520.

Before actually creating one or more encryption keys, the frequencies of the PUF oscillators 530 need to be known. Circuit logic calculates their frequencies in steps 705 through 740 of FIG. 7. These steps are listed as optional because they are really not part of creating the encryption key, but it is necessary to know these frequencies. Instead of using steps 705 through 740, these frequencies can also be measured by using, for example, an oscilloscope, or they can be calculated using a hardware-design program (e.g., the Xilinx™ Field-Programmable Gate Array Editor).

Note that these steps are performed by the circuit 500 of FIG. 5 with some very slight alterations which are easy to make with a couple of logic switches.

For each PUF oscillator 530, a start signal is generated at step 710 which starts it oscillating (step 715). The ticks of both the PUF oscillator 530 and the system clock 100 are counted (steps 720, 725). A stop signal is generated at step 730, and the two countings are stopped (step 735).

The frequency of the PUF oscillator 530 under test is then derived by the formula:

frequency of PUF oscillator=frequency of system clock*(measured tick count of PUF oscillator)/(measured tick count of system clock)

As discussed above in reference to FIG. 2, the slight manufacturing variability in the components of each PUF oscillator 530 ensures that, when measured very carefully using the above technique of steps 705 through 740, every PUF oscillator 530 will have a frequency that is slightly different from the frequencies of all of the other PUF oscillators 530. The range of variability of PUF oscillator 530 frequencies depends upon specific manufacturing techniques, but experimental results have shown that frequency variability among "identically" produced PUF oscillators 530 can be as large as 5%.

However, it is important to note that this frequency variability applies when one PUF oscillator 530 is compared to another, but not when the same PUF oscillator 530 is measured more than once. In the latter case, each PUF oscillator 530 presents a stable frequency over its entire lifetime. Because this stability is important, and because PUF oscillators 530 are somewhat sensitive to voltage, atmospheric, magnetic, and other environmental variations, they are usually shielded from outside influences and are placed near one another.

Once the frequencies of the PUF oscillators 530 are known, they are stored in volatile memory. Then the list of selected PUF oscillators 530 is subjected to a permutation in step 745. This means that the list of PUF oscillators 530 is ordered by some non-random technique that is based, at least in part, on the measured frequencies of the selected PUF oscillators 530. For example, the selected PUF oscillators 530 are ordered from the one with the lowest measured frequency up to the one with the highest measured frequency (or from the highest frequency to the lowest frequency). Many other permutations are known and can be used. However, it is important that the same permutation be used each time the host device wishes to derive the same encryption key.

When it is necessary to derive a different encryption key, a different set of PUF oscillators 530 can be selected (assuming that the circuit 500 has enough "extra" PUF oscillators 530 to support this option). Also or instead, different permutations may be used to derive different encryption keys.

FIG. 8 presents an example of using a permutation to derive the bits of an encryption key. In this simple example, R=3 PUF oscillators 530 are selected and are labeled A, B, and C. From the formula above, this produces 3 response bits. For FIG. 8, the permutation chosen is smallest to highest frequency. FIG. 8 lists all possible orderings of the R=3 frequencies. Once those frequencies have been measured, their order is used to pick the appropriate row of the table, and the three bits of the encryption key are read out. Of course, a useful encryption key would contain many more than 3 bits, but the process remains the same. The generated encryption key can then be stored in volatile memory.

Note that the process of deriving the encryption key from the table of FIG. 8 is, on the one hand, completely reproducible each time the host device is powered up because the frequencies of the selected PUF oscillators 530 A, B, and C are stable over time. On the other hand, note that no outside device can derive the encryption key because the inherent unpredictability from one PUF oscillator 530 to another makes it impossible to predict the frequency ordering of the PUF oscillators 530 on this particular device. Thus, the encryption key derived from the method of FIG. 7 is both very secure (no need to store it in non-volatile memory) and easily reproduced when necessary.

In the last step of FIG. 7, the derived encryption key is used for any known purpose, such as device authentication, data encryption, etc. This encryption key can even be used to encrypt a time-synchronization packet that has been very accurately time-stamped by the method of FIG. 6. This encryption key can also be used to encrypt the timestamp itself.

It will be understood that many additional changes in the details, materials, steps, and arrangement of parts, which have been herein described and illustrated to explain the nature of the invention, may be made by those skilled in the art within the principle and scope of the invention as expressed in the appended claims.

I claim:

1. An integrated circuit device comprising:
   a start oscillator group configured to start upon receiving a start signal;
   a first coincidence detector configured to detect a coincidence of an output of the start oscillator group and a reference oscillator signal;
   a stop oscillator group configured to start upon receiving a stop signal;
   a second coincidence detector configured to detect a coincidence between an output of the stop oscillator group and the reference oscillator signal;
   a first counter configured to start upon receiving the start signal, to increment a first accumulator when receiving an output of the start oscillator group, and to stop when receiving an output of the first coincidence detector;
   a second counter configured to start when receiving an output of the first coincidence detector, to increment a second accumulator when receiving the reference oscillator signal, and to stop when receiving an output of the second coincidence detector;
   a third counter configured to start when receiving an output of the second coincidence detector, to increment a third accumulator when receiving the reference oscillator signal, and to stop when receiving an output of the first coincidence detector; and
   a fourth counter configured to start upon receiving the stop signal, to increment a fourth accumulator when receiving an output of the second oscillator group, and to stop when receiving an output of the second coincidence detector;
   wherein each of the start and stop oscillator groups comprises a plurality of oscillators implemented as physical unclonable functions ("PUFs");
   wherein each of the start and stop oscillator groups comprises:
      a D flip flop;
      the plurality of oscillators wired in parallel, each oscillator of the plurality of oscillators configured to start oscillating upon receiving a signal from the D flip flop;
      and a multiplexor configured to receive outputs from the plurality of oscillators and to output a selected one of its inputs;
   wherein each plurality of oscillators comprises (R/2) oscillators where ceiling(log base 2 (R!)) is a power of 2 greater than or equal to 128.

2. The integrated circuit device of claim 1 wherein the device is selected from the group consisting of: a field-programmable gate array, a graphics processing unit, and a microprocessor chip.

3. The integrated circuit device of claim 1 wherein the oscillators of the plurality of oscillators are selected from the group consisting of: a delay PUF, a static random-access memory PUF, a butterfly PUF, a bistable ring PUF, a digital PUF, and a metal resistance PUF.

4. The integrated circuit device of claim 3 wherein each oscillator of the plurality of oscillators is a delay PUF comprising a ring oscillator.

5. The integrated circuit device of claim 4 wherein each ring oscillator of the plurality of oscillators comprises a look-up-table.

6. The integrated circuit device of claim 1 wherein each oscillator of the plurality of oscillators has an oscillation frequency differing from that of all other oscillators in the plurality of oscillators.

7. The integrated circuit device of claim 1 wherein the first and second coincidence detectors are selected from the group consisting of: a Hogge phase detector and an Alexander phase detector.

8. The integrated circuit device of claim 1 wherein the first and second coincidence detectors detect a coincidence when rising edges of an output of an oscillator group and the reference oscillator signal occur simultaneously.

9. The integrated circuit of claim 1 further comprising:
   circuit logic configured to generate the start and stop signals; and
   circuit logic configured to calculate a time duration of an interval between the start and stop signals in terms of a period of the reference oscillator signal, of the first, second, third, and fourth accumulator values, and of periods of the start and stop oscillator groups.

10. The integrated circuit of claim 1 further comprising, for each of the start and stop oscillator groups:
    circuit logic configured to calculate and to store an oscillation frequency of an oscillator of the plurality of oscillators in the oscillator group.

11. A method for using physical unclonable functions ("PUFs") to calculate a time duration of an interval, the method comprising:
    selecting a first oscillator of a first plurality of oscillators;
    selecting a second oscillator of a second plurality of oscillators;
    generating a start signal at a start of the interval to be timed;
    starting the selected first oscillator oscillating;
    starting a first counting of oscillations of the selected first oscillator;
    upon detecting a coincidence between the oscillations of the selected first oscillator and a reference oscillator, stopping the first counting, starting a second counting of oscillations of the reference oscillator, and stopping a third counting of oscillations of the reference oscillator;
    generating a stop signal at an end of the interval to be timed;
    starting the selected second oscillator oscillating;
    starting a fourth counting of oscillations of the selected second oscillator;
    upon detecting a coincidence between the oscillations of the selected second oscillator and a reference oscillator, stopping the second counting, starting the third counting, and stopping the fourth counting; and
    calculating the time duration of the interval between the start and stop signals in terms of a period of the reference oscillator signal, of the first, second, third, and fourth accumulator values, and of periods of the start and stop oscillator groups;
    wherein the selected first and second oscillators are implemented as PUFs;
    wherein each of the first and the second oscillators comprises:

a D flip flop;

the first and the second oscillators wired in parallel, each oscillator of the first and the second oscillators configured to start oscillating upon receiving a signal from the D flip flop;

and a multiplexor configured to receive outputs from the first and the second oscillators and to output a selected one of its inputs;

wherein each of the first and the second oscillators comprises (R/2) oscillators where ceiling(log base 2 (R!)) is a power of 2 greater than or equal to 128.

12. The method for using PUFs to calculate a time duration of an interval of claim 11 further comprising:

calculating and storing an oscillation frequency of each of the selected first and second oscillators.

13. The method for using PUFs to calculate a time duration of an interval of claim 11 further comprising:

adding a time of the start signal to the calculated time duration of the interval between the start and stop signals to form a timestamp.

14. A method for using physical unclonable functions ("PUFs") to generate an encryption key, the method comprising:

selecting a plurality of oscillators from a start oscillator group and from a stop oscillator group, wherein each of the start and stop oscillator groups comprises a plurality of oscillators implemented as PUFs;

calculating a frequency for each of the selected oscillators;

creating a permutation of the selected plurality of oscillators, the permutation based, at least in part, on the calculated frequencies of the selected plurality of oscillators; and based, at least in part, on the permutation, generating bits of the encryption key; and storing the generated encryption key in volatile memory;

wherein each of the start and stop oscillator groups comprises:

a D flip flop;

the plurality of oscillators wired in parallel, each oscillator of the plurality of oscillators configured to start oscillating upon receiving a signal from the D flip flop;

and a multiplexor configured to receive outputs from the plurality of oscillators and to output a selected one of its inputs;

wherein each plurality of oscillators comprises (R/2) oscillators where ceiling(log base 2 (R!)) is a power of 2 greater than or equal to 128.

15. The method for using PUFs to generate an encryption key of claim 14 wherein calculating a frequency for a selected oscillator comprises:

generating a start signal;

starting the selected oscillator oscillating;

starting a first counting of oscillations of the selected oscillator;

starting a second counting of oscillations of a reference oscillator;

generating a stop signal; stopping the first and second countings; and calculating the frequency of the selected oscillator as a frequency of the reference oscillator multiplied by a result of the first counting and divided by a result of the second counting.

16. The method for using PUFs to generate an encryption key of claim 14 wherein the permutation is selected from the group consisting of: ordering the calculated frequencies of the selected oscillators from lowest to highest and ordering the calculated frequencies of the selected oscillators from highest to lowest.

17. The method for using PUFs to generate an encryption key of claim 14 further comprising:

using the stored encryption key to encrypt a timestamp.

* * * * *